Patented July 30, 1935

2,009,764

UNITED STATES PATENT OFFICE 2,009,764

FINING HEAT ABSORBING REDUCED GLASSES

Robert H. Dalton, Corning, N. Y., assignor to Corning Glass Works, Corning, N. Y., a corporation of New York No Drawing. Original application July 30, 1932, Serial No. 627,102. Divided and this application January 15, 1934, Serial No. 706,777

5 Claims. (Cl. 106—36.1)

This invention relates to the fining of glass and has for its object the fining of glass melts which have been reduced by the addition of batches therefor of reducing agents such as carbon, carbonaceous materials, zinc dust, and the like, herein referred to as reduced glasses.

The above and other objects may be attained by practicing my invention which embodies among its features the addition to such glass batches of a small amount of a substance containing bromine.

Glasses reduced by the addition of carbon or carbonaceous materials are practically never perfectly fined and there has long been a need for means for fining such glasses. Arsenic which is ordinarily used as a fining agent is obviously without value in reduced glasses, because the successful use of arsenic for this purpose requires oxidizing conditions such as the presence of a nitrate or the use of the higher oxide of arsenic. Moreover, it is sometimes difficult to obtain uniform reduction in glasses reduced by carbonaceous materials because the carbon, although initially uniformly distributed throughout the batch, does not readily dissolve in the glass when the batch is melted but tends to segregate and rise to the top of the melt where it may be burned off or cause over-reduction while the bottom part of the melt is insufficiently reduced.

I have discovered that substances containing bromine, such as bromides, bromates, and the like, are very efficient fining agents when added in small quantities to batches for reduced glasses. I have further found that substances containing bromine are of themselves mild reducing agents and inasmuch as they, for the most part, seem to dissolve readily in glass they tend to promote more uniform reduction throughout the melt than is possible through the use of carbon alone. On account of their mild action they do not tend to produce the so-called "carbon amber" coloration and the use of an excessive amount, therefore, has no ill effect, although on account of expense I prefer to use not more than 2%, which I have found to be ample for fining purposes.

My invention is particularly valuable in fining the so-called heat absorbing glasses which contain ferrous iron and must be melted with strong reduction. Heretofore, it has been practically impossible to fine such glasses and at the same time to maintain the proper heat absorbing efficiency. The following batches with the results of their melting will illustrate the application of my invention to heat absorbing glasses:

|  | A | B |
| --- | --- | --- |
| Sand | 335 | 335 |
| Sodium carbonate | 85 | 80 |
| Borax | 125 | 125 |
| Ferric oxide | 10 | 10 |
| Carbon | ½ | ½ |
| Potassium bromide |  | 10 |
| Degree of fining | Fine bubbles. | No bubbles. |
| Heat transmission in 2 mm. thickness | 6.3% | 5.9% |

Glass A, which contained carbon but no bromine, is an example of a prior heat absorbing glass. It was reduced as is shown by the low heat transmission but was not fined.

Glass B is an example of the use of a bromine containing material in conjunction with a reducing agent in accordance with my invention. It was perfectly fined and its heat transmission, which is slightly lower than that of glass A, apparently indicates that bromine materials in no way interfere with the reducing action of carbon. In fact, in the example cited the results are slightly better with bromide and carbon than with carbon alone.

Low expansion borosilicate heat absorbing glasses are particularly difficult to fine on account of their high melting points and relatively high viscosities at melting temperatures. By the addition of 1 to 2% of a material containing bromine to such glasses, I am able to fine them and still retain their heat absorbing efficiency.

I have found also that chlorine containing materials are not as efficient fining agents as materials containing bromine and, when introduced into glasses in amount comparable to the amount of bromine material which I have found necessary to cause fining, the chlorine material tends to produce opal glasses, particularly in the case of low expansion borosilicates. I, therefore, make no claim to the use of chlorine materials for this purpose.

In the following claims the terms "reduced glass" and "reduced glasses" refer to glasses which are melted under reducing conditions, or to glasses which result from melting batches that contain a reducing agent such as carbon or carbonaceous materials and in this connection bromine materials are considered to be reducing agents.

This application is a division of my original application filed July 30, 1932, Sr. No. 627,102.

What I claim is:

1. The method of fining reduced glasses which includes adding to the batches therefor a small amount of a bromine containing material and a reducing agent.

2. The method of fining reduced glasses which includes adding to the batches therefor a small amount of an alkali bromide and a reducing agent.

3. A glass batch which contains a reducing agent and a small amount of a bromine containing material.

4. A heat absorbing glass batch which contains a reducing agent and a small amount of a bromine containing material.

5. A reduced glass which is substantially free from bubbles and which shows by analysis the presence of bromine.

ROBERT H. DALTON.